United States Patent
Krishnan

[11] Patent Number: 6,127,799
[45] Date of Patent: Oct. 3, 2000

[54] METHOD AND APPARATUS FOR WIRELESS POWERING AND RECHARGING

[75] Inventor: Rajesh Krishnan, Arlington, Mass.

[73] Assignee: GTE Internetworking Incorporated, Cambridge, Mass.

[21] Appl. No.: 09/312,519

[22] Filed: May 14, 1999

[51] Int. Cl.[7] .................. H01M 10/44; H01M 10/46
[52] U.S. Cl. ............................. 320/104; 320/108
[58] Field of Search ...................... 320/104, 109, 320/108

[56] References Cited

U.S. PATENT DOCUMENTS

| | | | |
|---|---|---|---|
| 3,781,647 | 12/1973 | Glaser | 322/2 |
| 3,971,454 | 7/1976 | Waterbury | 180/65 R |
| 3,989,994 | 11/1976 | Brown | 321/1.5 |
| 4,685,047 | 8/1987 | Phillips, Sr. | 363/126 |
| 5,396,538 | 3/1995 | Hong | 379/58 |
| 5,411,537 | 5/1995 | Munshi et al. | 607/33 |
| 5,503,350 | 4/1996 | Foote | 244/1 R |
| 5,596,567 | 1/1997 | deMuro et al. | 320/5 |
| 5,733,313 | 3/1998 | Barreras, Sr. et al. | 607/33 |
| 5,769,877 | 6/1998 | Barreras, Sr. | 607/61 |
| 5,982,139 | 11/1999 | Parise | 320/109 |

OTHER PUBLICATIONS

Kraus, John D., *Antennas*, pp. 713–715. No Date.

Selvidge et al., "Power and Communication Techniques for Physically Isolated Integrated Circuits", Proceeding of the Stanford Conference on Advanced Research in VLSI, (May 1987), pp. 231–247.

Brown, William C., "The Early History of Wireless Power Transmission", Solar Energy, vol. 56, No. 1, pp. 3–21, (1996).

"Space Power References", http://www.tsgc.utexas.edu/tsgc/power/general/refs.html. No Date.

"Environmental Effects—The PowerSat Beam and the Environment", http://www.permanent.com/p_sps_bm.htm. No Date.

*Primary Examiner*—Edward H. Tso
*Attorney, Agent, or Firm*—Leonard Charles Suchyta; Floyd E. Anderson

[57] ABSTRACT

An arrangement is provided for charging a charge storage device by placing the charge storage device in an RF or microwave radiation field. One or more antennas which receive the radiated RF electromagnetic field are placed on the charge storage device. Rectifiers connected to the antennas rectify the received RF electromagnetic field an produce a DC output current which is used to charge the charge storage device. The charge storage device may be a battery or a capacitor and may form an integral part of an electronic device. The same RF field that charges the charge storage device can also be employed to communicate data to transponders which may be associated with computing devices.

26 Claims, 8 Drawing Sheets

METHOD AND APPARATUS FOR WIRELESS POWERING AND RECHARGING

BACKGROUND OF THE INVENTION

1. Field of the Invention

This application relates to the field of providing an electrical charge to a charge storage device and more particularly to the field of contactless charging of batteries using RF radiation.

2. Description of Related Art

Electronic devices, in particular electronic devices used for wireless communication, are typically powered by rechargeable batteries, capacitors or photoelectric cells. Photoelectric cells may not provide adequate power under low light conditions. Rechargeable batteries and capacitors and devices with built-in batteries, all of which will subsequently be referred to as batteries, have to recharged periodically, which is typically done by placing the battery in a charger to establish a path for the electric charging current between the battery and the charger.

It is also known to charge batteries by electromagnetic induction. In this case, the battery includes a pick-up coil which is placed in close proximity to an electromagnetic transmitting coil to intercept the electromagnetic flux lines of the transmitting coil. Typically, one transmitting coil is required for each battery to be charged.

Batteries may also be permanently incorporated or sealed inside an electronic apparatus, with none of the electrical connections being accessible from the outside. Moreover, situations may arise where a large number of batteries has to be charged simultaneously and/or the external dimensions, shape and contact arrangement of batteries may make it difficult to place and connect a large number of batteries in a charging device at the same time. In addition, the low power consumption of today's electronic devices may make it feasible to use batteries with a smaller storage capacity and to charge these batteries more frequently.

Therefore, a need exists for an improved arrangement for recharging a battery, particularly for bulk recharging a large number of batteries without positioning the batteries proximal to an electrical contact or an electromagnetic induction coil.

SUMMARY OF THE INVENTION

A battery charging arrangement is provided in which a rechargeable charge storage device is placed in an RF or microwave radiation field.

In general, in one aspect of the invention, a charge storage device is charged by exposing the charge storage device to an RF electromagnetic field radiated into free space. The charge storage device includes one or more antennas disposed on the device and adapted to receive the radiated RF electromagnetic field. One or more rectifiers are connected to the antennas for rectifying the received RF electromagnetic field into a DC output current. The DC output current produced by the rectifier is used to charge the charge storage device.

Embodiments of the invention may include one or more of the following features. The antenna may be one or more dipole antennas which may be combined to form at least two subsets of dipole antenna element arrays, wherein one subset may be oriented at an acute or a right angle with respect to at least one other subset. The antennas or dipole antennas may be placed on more than one outside surface of the charge storage device which enclose an acute or a right angle with respect to each other. The charge storage device may also include an electronic control for monitoring and/or controlling the charging conditions of the device. The rectifier may be a bridge rectifier.

At least a portion of the charge storage device may be enclosed by an electromagnetic shield in order to shield the portion of the charge storage device from the RF electromagnetic field. The antenna means may be placed on an outside surface of the electromagnetic shield. The charge storage device may be a rechargeable battery which may include an organic polymer, or a capacitor. The charge storage device may be in the form of a thin sheet, with the antenna disposed on a major surface of the sheet. The RF electromagnetic field may be a microwave field operating in a frequency range between 1 and 100 GHz.

According to another aspect of the invention, a charging system for contactless charging a charge storage device includes a source of an RF electromagnetic field radiated into free space and a support for receiving and supporting the charge storage device in the free space. The charging system may include a housing for confining the RF electromagnetic field inside the housing, wherein the source of the RF electromagnetic field and the support are enclosed in the housing.

According to yet another aspect of the invention, a wireless communication system includes a base station and at least one transponder for wireless transmission of data between the transponder and the base station. A charge storage device is connected to the transponder for providing electric power to the transponder. The charge storage device includes an antenna receiving an RF electromagnetic field and a converter for converting the received RF electromagnetic field into an electric charging current which is used to charge the charge storage device.

Embodiments of this aspect of the invention may include one or more of the following features. The base station and the transponder transmitting the data and the RF electromagnetic field for charging the charge storage device may operate in a common frequency range. The data may be transmitted by modulating the RF electromagnetic field. The transponders may include a memory for storing the data, wherein the stored data may include characteristic properties of an object associated with the transponder. For example, the transponder may include inventory information, such as a price or an SKU, of an item displayed or sold in a store and may be attached to the item. Computing devices may also be associated with the transponders, wherein the transponders and/or the computing devices receive electrical power from the charge storage device and the computing devices furthermore receive data via a modulation of the RF electromagnetic field.

Further features and advantages of the present invention will be apparent from the following description of preferred embodiments and from the claims.

DETAILED DESCRIPTION OF PREFERRED EMBODIMENT

Figure 1:
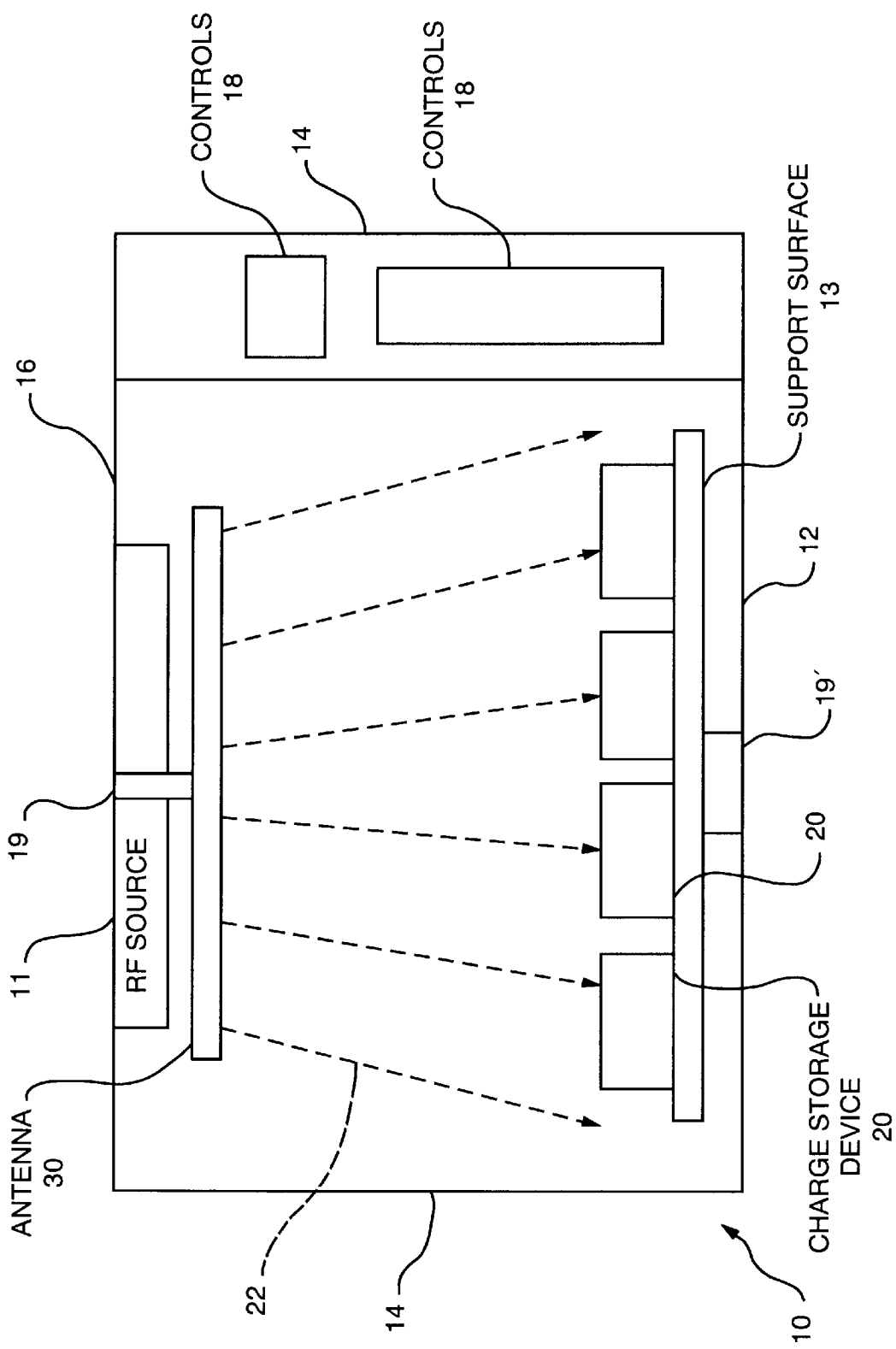
FIG. 1 shows schematically a charging system using an RF radiation field.

Referring to FIG. 1, a housing 10 includes an RF source 11, e.g., an oscillator circuit coupled to a power amplifier or a magnetron, generating RF power. The RF power is coupled to an antenna 30 which radiates the RF power, preferably unidirectionally, towards a bottom portion 12 of the housing 10. In the illustrated example, the antenna 30 is supported from a top housing portion 16, but may also be located on a side wall 14 of the housing 10 (not shown) and may be adapted to rotate about a vertical axis 19 to distribute the typically linearly polarized RF radiation uniformly in the horizontal plane of the bottom portion 12. The operation of the RF source 11, e.g., the duty cycle and the operating time, can be controlled via controls 18 located on an operating panel which may be disposed on the housing, as seen in FIG. 1, or implemented by remote control (not shown).

A number of charge storage devices 20, e.g. rechargeable batteries and/or devices, are placed on a support surface 13 inside the housing 10 or directly on the bottom portion 12 of the housing 10. The batteries 20 are provided with antenna elements, as illustrated for example in FIG. 2A. The antenna elements, which will be discussed in detail below, are configured to absorb the RF energy emitted by antenna 30 and to convert the RF energy into an electrical charging current fo charging the batteries. To enable efficient absorption of the polarized RF emission, the antenna elements are preferably oriented parallel to the polarization direction; to accommodate a non-parallel or even a random orientation of the antenna dipoles with respect to the polarization direction, the RF antenna 30 and/or the charge storage devices 20 may be rotated about respective rotation axes 19 and 19', as described above.

The RF energy is preferably supplied in the form of microwaves typically having a frequency of between several Gigahertz and several tens of Gigahertz. For example, typical microwave ovens operate at a frequency of 2.45 GHz, corresponding to a wavelength of approximately 12.5 cm. Higher frequencies correspond to shorter wavelengths, with the wavelength inversely proportional to the frequency. The RF frequency may be adapted to specific device characteristics, such as the physical dimensions and the RF absorption strength of the device 20 to be placed in the RF field.

Figure 2A:
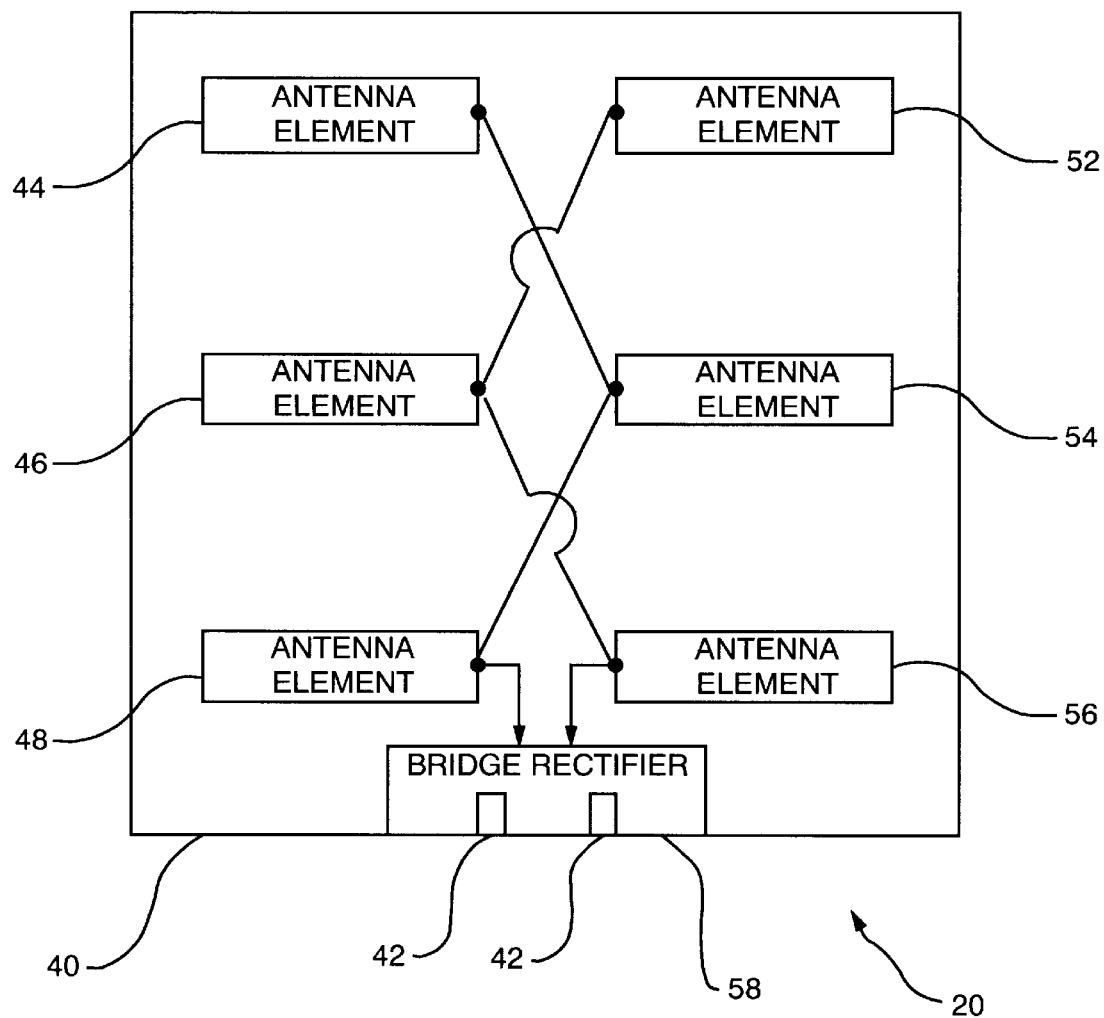
FIG. 2A is a top view of a charge storage device with an antenna arrangement according to the invention.
Figure 2B:
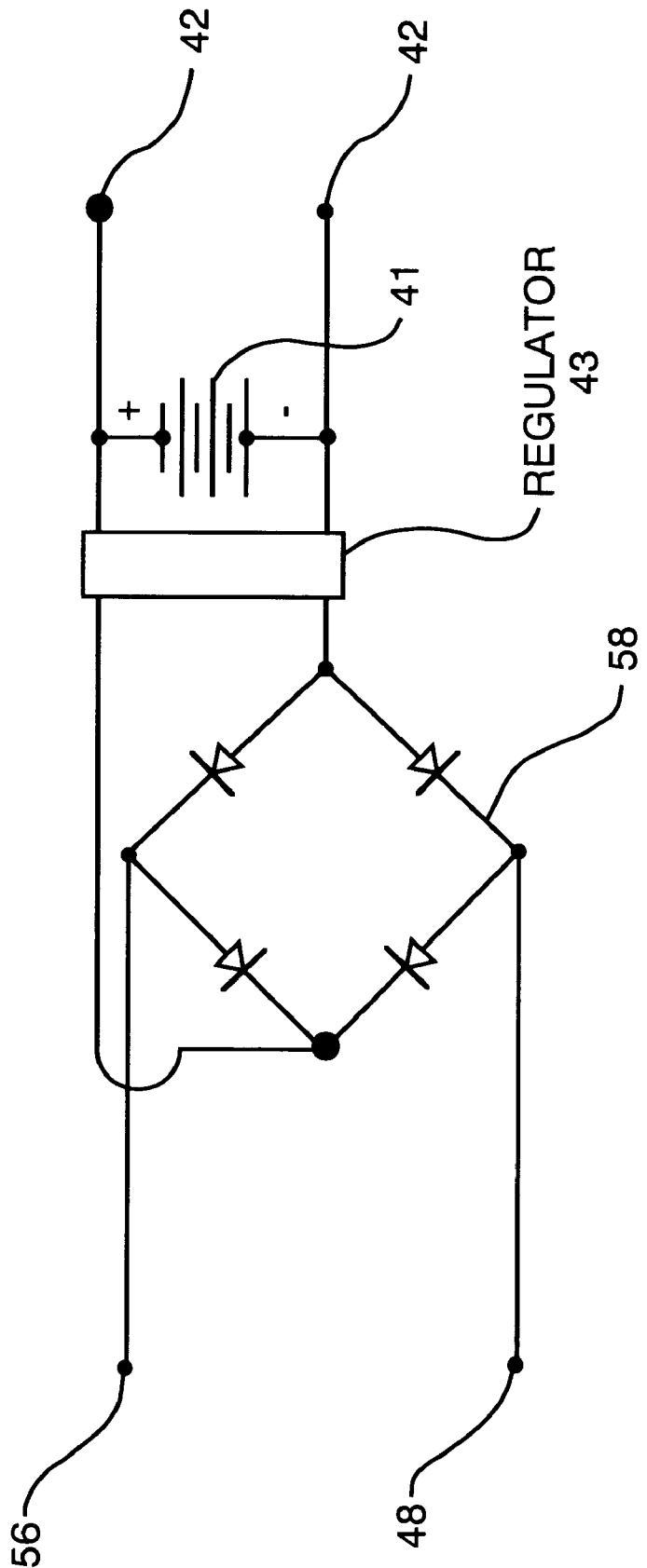
FIG. 2B is a rectifier circuit of the device of FIG. 2A.

Referring now to FIG. 2A, a top view shows an arrangement of antenna elements 44, 46, 48, 52, 54, 56 disposed on a top surface 40 of the battery 20 and forming an antenna array. To efficiently couple the antenna array to the radiation field, each of the antenna elements 44, 46, 48, 52, 54, 56 preferably has a length of approximately $\lambda/2$, wherein $\lambda$ is the free space wavelength of the RF radiation. If more than one dipole is used, the spacing between adjacent antenna dipoles 44 and 46; 46 and 48; 52 and 54; and 54 and 56 is preferably also $\lambda/2$. The number of dipoles determines the power conversion efficiency of the antenna array. In the present example, at an RF frequency of 2.45 GHz, the battery 20 has a width of approximately 12.5 cm, with the length of the battery 20 depending on the number of dipoles 44, 52; 46, 54; and 48, 56 employed. The individual antenna elements are preferably connected as illustrated in FIG. 2A, to effectively add the voltages produced by the RF field between the antenna elements of each dipole, i.e., antenna element 46 is connected to elements 52 and 56, and element 54 is connected to elements 44 and 48. The produced voltage is an AC voltage with a frequency equal to the RF frequency. The AC voltage is rectified by bridge rectifier 58 and supplied via an optional regulator 43 to battery 41, as indicated in FIG. 2B. The charged battery 41 can then supply at battery terminals 42 a DC current to an external device (not shown).

Figure 3:
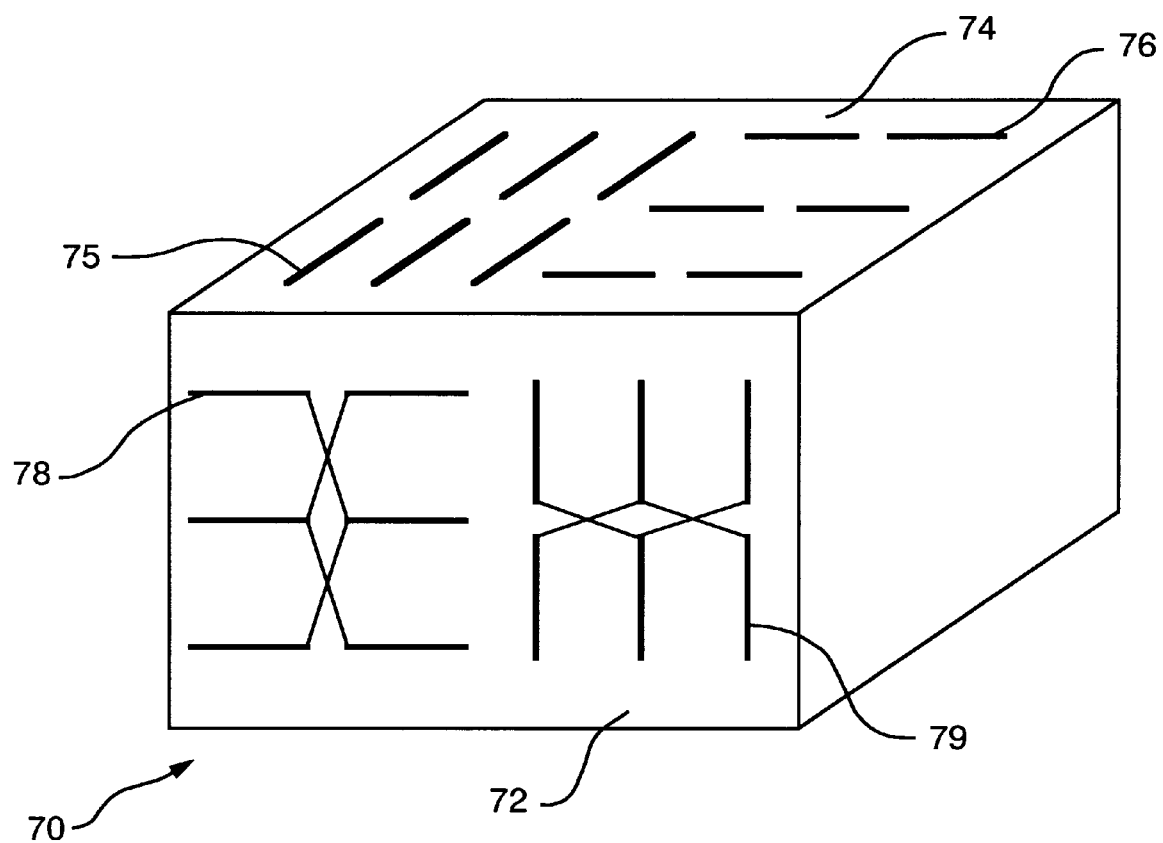
FIG. 3 is another embodiment of the charge storage device according to the invention.

Referring now to FIG. 3, a larger surface area can be covered by the antennae elements and the RF reception of the battery can be made more omnidirectional by placing antenna elements on more than one surface of the battery 70. For example, antenna elements 73 may be arranged at various angles relative to the marginal edges of the surfaces 72, 74 of the battery or device 70, for example at right angles, as indicated in FIG. 3, to make the produced voltage less dependent on the polarization direction of the emitted RF radiation. The antenna elements may have the same spacing and may be connected in the same manner as those of FIG. 2A.

Figure 4:
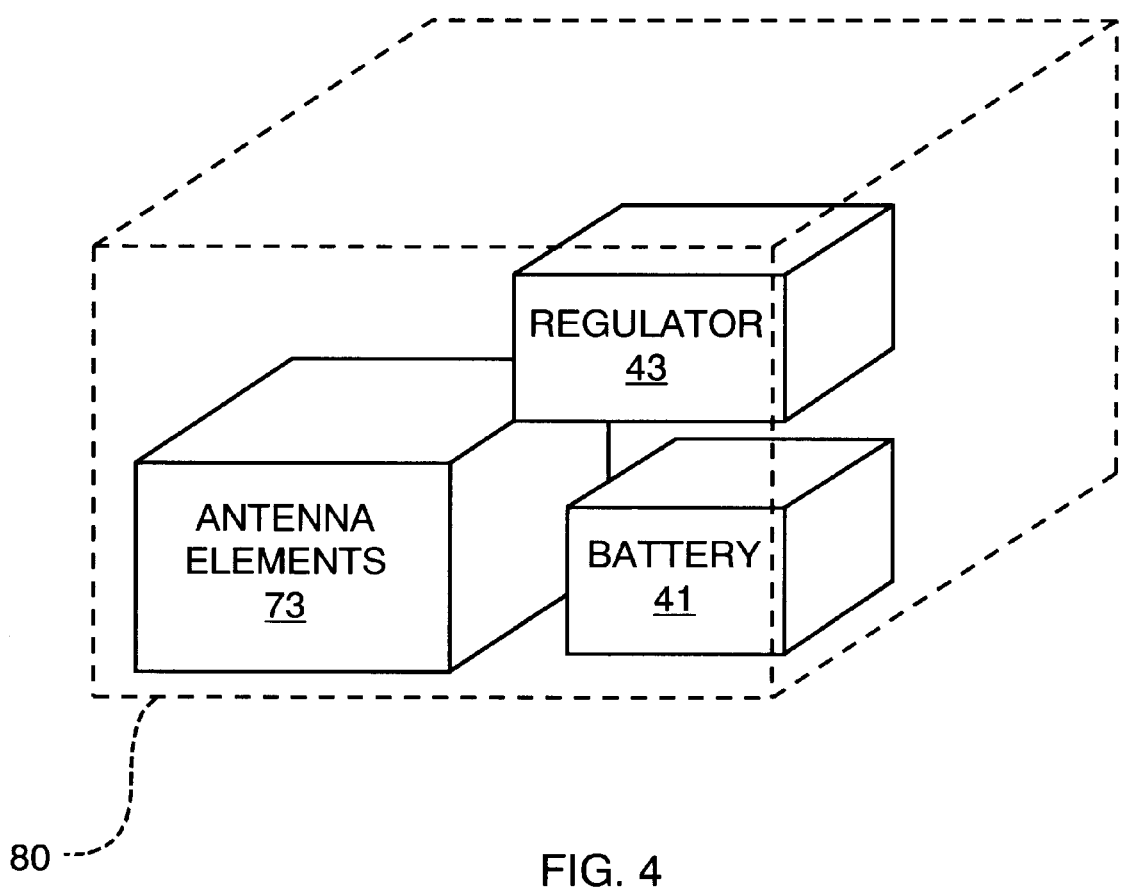
FIG. 4 is the charge storage device of FIG. 3 with radiation shielding.

Referring now to FIG. 4, the device 70 may include the battery 41, the regulator 43 and other components that perform device operations. These components may be adversely affected by the RF radiation, for example by the induction of spurious charges or the generation of heat. Consequently, these components may require electromagnetic shielding for reliable operation. Adequate shielding can be provided, for example, by enclosing the components inside a Faraday cage 80, as is known in the art. The antennas may be placed outside the Faraday cage 80 without reducing their effectiveness. Alternatively, the RF frequency and/or the materials of which the battery and other electronic devices exposed to the RF field are made, may be selected for low absorption of the radiated RF power. For example, modern batteries can be manufactured from solid electrolytes embedded in plastics, thereby obviating the need for metals which tend to absorb RF energy. Such plastic batteries can be manufactured in almost any suitable geometry and shape. The present invention can be advantageously adapted for charging a battery of this type.

Figure 5:
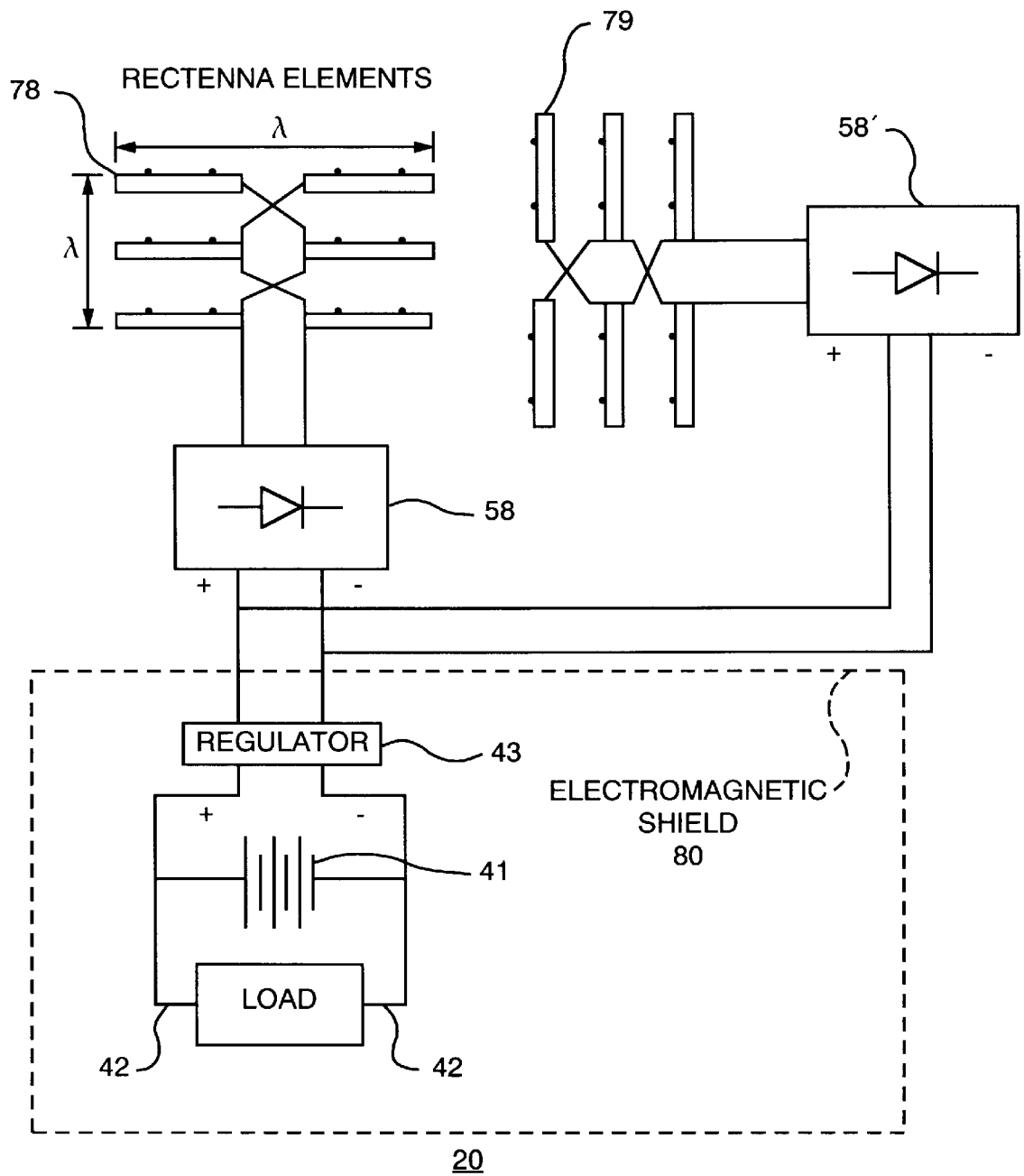
FIG. 5 is a circuit diagram of the charge storage device of FIG. 3.

Referring now to FIG. 5, the antennas of the device of FIG. 3 that have different orientations, are connected in such a way that the AC output voltage of each array of dipoles 78, 79 is rectified separately by dedicated rectifiers 58, 58', with the DC currents of rectifiers 58, 58' being added together and supplied to the optional regulator 43 and the battery 41, as discussed above with reference to FIG. 2B.

Figure 6A:
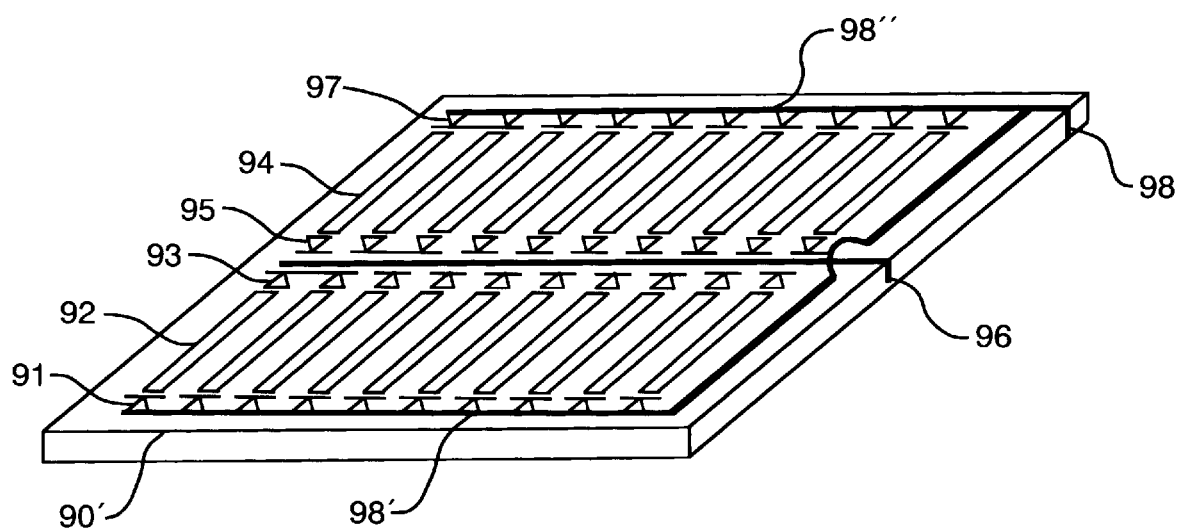
FIGS. 6A and 6B is another embodiment of the charge storage device with a laminar structure.
Figure 6B:
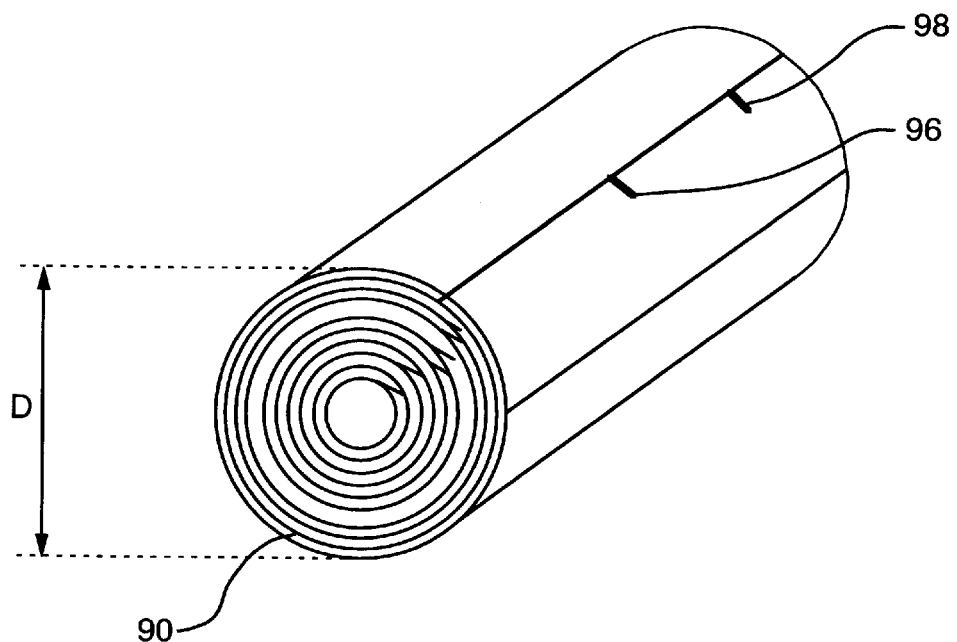

Referring now to FIGS. 6A and 6B, the exemplary plastic battery may be manufactured in the form of a sheet 90'. Antenna elements 92, 94 can be arranged inside the sheet 90' or on a major surface of sheet 90' and connected so as to provide a maximum output voltage and/or RF power conversion efficiency. In the embodiment illustrated in FIG. 6B, the sheet 90' also includes diodes 91, 93, 95, 97 which are connected between the antenna elements 92, 94 and respective voltage output lines 96 and 98', 98". The voltage output lines 98', 98" are connected in parallel to output terminal 98. As seen in FIG. 6A, the rectifier diodes 91, 93, 95, 97 are connected so as to produce a positive voltage on terminal 96 and a negative voltage on terminal 98, independent of the phase of the RF radiating field. The diode arrangement of FIG. 6A is functionally equivalent to the arrangement of FIG. 5.

In principle, the flat battery configuration 90' can be adapted to any suitable shape. FIG. 6B illustrates a battery that is rolled into the shape of a cylinder 90 with an outside diameter D. If the diameter D of the cylinder is substantially smaller than the RF wavelength λ, then all the antenna elements 92 effectively operate as a single dipole. Moreover, this antenna arrangement provides efficient power conversion of the RF radiation and shielding from the RF radiation of sensitive components located inside the cylinder 90.

Figure 7:
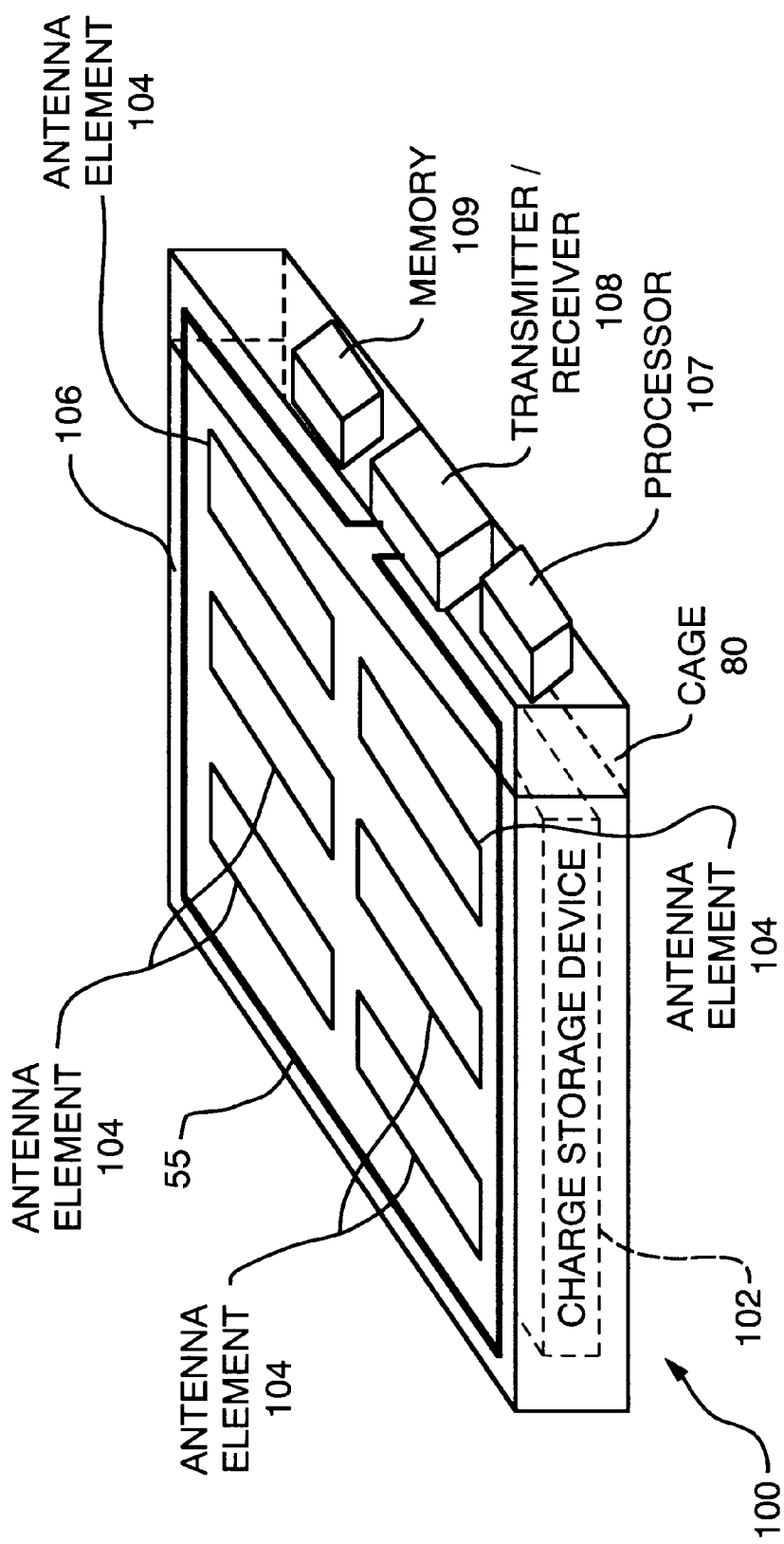
FIG. 7 is a communication device incorporating the charge storage device of the invention.

Referring now to FIG. 7, an exemplary wireless communication device 100 includes a charge storage device 102 which may be a rechargeable battery or an "ultracapacitor" capable of storing a large charge, antenna elements 104 which may be similar to those illustrated in FIG. 2, an antenna 106 for wireless communication and a transmitter/receiver 108 connected to the antenna and powered by the battery 102. The wireless communication device 100 may also include a processor 107 for processing data transmitted between the wireless communication device 100 and a base station (not shown) as well as a memory 109 for storing the transmitted and/or processed data. The transmitter/receiver 108 and other components affected by RF radiation may be located inside a shielded cage 80, as described above. The electrical connections inside the communication device 100 have been omitted from the drawing for clarity. The entire device 100 may be hermetically sealed, so that the electrical connections are not accessible from the outside. Such devices can be used, for example, in hostile environments or as active or "intelligent" labels attached to merchandise and other goods. Labels of this type could, for example, be remotely programmed and read out without the need to attach them visibly to the outside of the article.

The method of charging a large number of batteries and other charge storage devices, such as capacitors, by exposing the charge storage devices to an RF field may be used to batch-charge a large number of rechargeable devices simultaneously without making electrical contact to the devices. The charging method is suitable for charging charge storage devices that have a non-traditional shape or contact arrangement.

Other applications may include charging a large number of computing devices, such as processors of a parallel computing system, which are connected to independent charge storage devices. In addition, data and/or timing information may be transmitted to the computing devices by modulating the RF field.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

We claim:

1. A charge storage device chargeable by an RF electromagnetic field radiated into free space, comprising:
    at least one antenna adapted to receive the radiated RF electromagnetic field, the at least one antenna being a plurality of dipole antenna elements that are combined to form at least two subsets of dipole antenna element arrays, wherein a subset is oriented at an acute or a right angle with respect to at least one other subset; and
    a rectifier connected to the antenna for rectifying the received RF electromagnetic field into a DC output current;
    wherein the DC output current produced by the rectifier charges the charge storage device.

2. The charge storage device of claim 1, wherein the antenna is a dipole antenna.

3. The charge storage device of claim 1, wherein the charge storage device comprises at least two surfaces that are not parallel to each other, and wherein the antenna are disposed on at least the two surfaces.

4. The charge storage device of claim 1, wherein the rectifier is a bridge rectifier.

5. The charge storage device of claim 1, further comprising:
    an electronic control for controlling charging conditions of the charge storage device.

6. The charge storage device of claim 1, further comprising;
    an electromagnetic shield enclosing at least a portion of the charge storage device for shielding the portion of the charge storage device from the RF electromagnetic field,
    wherein the antenna is disposed on an outside surface of the electromagnetic shield.

7. The charge storage device of claim 1, wherein the charge storage device is a battery.

8. The charge storage device of claim 7, wherein the battery comprises an organic polymer.

9. The charge storage device of claim 1, wherein the charge storage device is a capacitor.

10. The charge storage device of claim 7, wherein the battery is formed as a thin sheet and the antenna is disposed on a major surface of the sheet.

11. The charge storage device of claim 1, wherein the RF electromagnetic field has a frequency in the range between 1 GHz and 100 GHz.

12. A charging system for contactless charging a charge storage device, comprising:
    a source of an RF electromagnetic field radiated into free space; and
    a support for positioning the storage device in the free space;
    the charge storage device comprising:
        an antenna adapted to receive the radiated RF electromagnetic field, the antenna being a plurality of dipole antenna elements that are combined to form at least two subsets of dipole antenna element arrays, wherein a subset is oriented at an acute or a right angle with respect to at least one other subset; and
        a rectifier connected to the antenna for rectifying the received RF electromagnetic field to produce a DC output current,
        wherein the DC output current charges the charge storage device.

13. The charging system of claim 12, further comprising a housing for confining the RF electromagnetic field, wherein the source of the RF electromagnetic field and the support are enclosed in the housing.

14. A method for contactless charging a charge storage device having an antenna, the method comprising:
    generating an RF electromagnetic field radiated into free space;
    exposing the antenna to the RF electromagnetic field, the antenna being a plurality of dipole antenna elements that are combined to form at least two subsets of dipole antenna element arrays, wherein a subset is oriented at an acute or a right angle with respect to at least one other subset;
    rectifying an RF voltage produced at the antenna by the RF electromagnetic field; and
    charging the charge storage device with the rectified RF voltage.

15. A wireless communication system comprising:

a base station;

at least one transponder for wireless transmission of data between the transponder and the base station;

a charge storage device connected to the transponder for providing electric power to the transponder, the charge storage device comprising:

a rotatable axis coupled to the charge storage device for rotating the charge storage device;

an antenna for receiving an RF electromagnetic field; and a converter for converting the received RF electromagnetic field to an electric charging current to charge the charge storage device.

16. The wireless communication system of claim 15, wherein the RF electromagnetic field has a frequency in the range between 1 GHz and 100 GHz.

17. The wireless communication system of claim 15, wherein at least the base station and the RF electromagnetic field have a common frequency range.

18. The wireless communication system of claim 15, wherein the data are transmitted by modulating the RF electromagnetic field.

19. The wireless communication system of claim 15, wherein the transponder comprises a memory for storing data.

20. The wireless communication system of claim 19, wherein the data stored in the transponder comprise characteristic properties of an object associated with the transponder.

21. The wireless communication system of claim 20, wherein the transponder is attached to the object and the characteristic properties include inventory information of the object.

22. The wireless communication system of claim 15, further comprising a plurality of computing devices associated with the transponders and receiving electrical power from the charge storage device, wherein the computing devices receive data via a modulation of the RF electromagnetic field.

23. A charge storage device chargeable by an RF electromagnetic field radiated into free space, comprising:

antenna means adapted to receive the radiated RF electromagnetic field, the antenna means being a plurality of dipole antenna elements that are combined to form at least two subsets of dipole antenna element arrays, wherein a subset is oriented at an acute or a right angle with respect to at least one other subset; and rectifier means connected to the antenna means for rectifying the received RF electromagnetic field into a DC output current;

wherein the DC output current produced by the rectifier means charges the charge storage device.

24. A battery chargeable by an RF electromagnetic field radiated into free space, comprising:

at least one antenna adapted to receive the radiated RF electromagnetic field; and a rectifier connected to the antenna for rectifying the received RF electromagnetic field into a DC output current;

wherein the DC output current produced by the rectifier charges the charge storage device; and wherein the battery is formed as a thin sheet and the antenna is disposed on a major surface of the sheet.

25. A charging system for contactless charging a charge storage device, comprising:

a source of an RF electromagnetic field radiated into free space;

a support for positioning the storage device in the free space; and a housing for confining the RF field, wherein the source of the RF field and the support are enclosed in the housing; the charge storage device comprising:

an antenna adapted to receive the radiated RF electromagnetic field; and a rectifier connected to the antenna for rectifying the received RF electromagnetic field to produce a DC output current, wherein the DC output current charges the charge storage device.

26. A wireless communication system comprising:

a base station;

at least one transponder for wireless transmission of data between the transponder and the base station;

a charge storage device connected to the transponder for providing electric power to the transponder, the charge storage device comprising:

antenna for receiving an RF electromagnetic field; and a converter for converting the received RF electromagnetic field to an electric charging current to charge the charge storage device, wherein the data are transmitted by modulating the RF electromagnetic field.

\* \* \* \* \*